US011755180B1

(12) United States Patent
Edelblut et al.

(10) Patent No.: US 11,755,180 B1
(45) Date of Patent: Sep. 12, 2023

(54) BROWSER ENABLED SWITCHING BETWEEN VIRTUAL WORLDS IN ARTIFICIAL REALITY

(71) Applicant: Meta Platforms Technologies, LLC, Menlo Park, CA (US)

(72) Inventors: Jeremy Edelblut, Mountain View, CA (US); Matthaeus Krenn, Sunnyvale, CA (US); John Nicholas Jitkoff, Seattle, WA (US)

(*) Notice: Subject to any disclaimer, the term of this patent is extended or adjusted under 35 U.S.C. 154(b) by 0 days.

(21) Appl. No.: 17/820,678

(22) Filed: Aug. 18, 2022

Related U.S. Application Data

(60) Provisional application No. 63/354,368, filed on Jun. 22, 2022.

(51) Int. Cl.
*G06F 3/0483* (2013.01)
*G06F 3/0484* (2022.01)
*G06F 3/04815* (2022.01)

(52) U.S. Cl.
CPC .......... *G06F 3/0483* (2013.01); *G06F 3/0484* (2013.01); *G06F 3/04815* (2013.01)

(58) Field of Classification Search
CPC ............... G06F 3/0482; G06F 16/9577; G06F 3/04815; G06F 40/106; G06F 16/951; G06F 3/04845; G06F 16/26; G06F 16/954; G06F 3/04817; G06F 3/0483; G06F 3/04842; G06F 16/958; G06F 2111/02; G06F 2203/04803; G06F 3/017; G06F 30/00; G06F 30/20; G06F 40/134; G06F 40/221; G06F 16/86; G06F 16/93; G06F 16/95; G06F 16/9535; G06F 21/52; G06F 40/143; G06F 9/451; G06F 16/00; G06F 16/1794; G06F 16/23; G06F 16/56; G06F 3/012; G06F 3/0481; G06F 3/04847; G06F 3/1423; G06T 19/006; G06T 11/00; G06T 19/00; G06T 15/005; G06T 2200/24; G06T 1/20; G06T 17/20; G06T 19/003; G06T 2200/08; G06T 2210/04

See application file for complete search history.

(56) References Cited

U.S. PATENT DOCUMENTS 10,592,064 B2 3/2020 Ames et al.
10,948,997 B1 3/2021 Victor-Faichney et al.
(Continued)

FOREIGN PATENT DOCUMENTS

CN 101996077 A 3/2011

OTHER PUBLICATIONS

International Search Report and Written Opinion for International Application No. PCT/US2023/018759, dated Jun. 14, 2023, 9 pages.

*Primary Examiner* — Rayeez R Chowdhury
(74) *Attorney, Agent, or Firm* — Potomac Law Group, PLLC

(57) ABSTRACT

Methods and systems described herein are directed to a virtual web browser for providing access to multiple virtual worlds interchangeably. Browser tabs for corresponding website and virtual world pairs can be displayed along with associated controls, the selection of such controls effecting the instantiation of 3D content for the virtual worlds. One or more of the tabs can be automatically generated as a result of interactions with objects in the virtual worlds, such that travel to a world, corresponding to an object to which an interaction was directed, is facilitated.

20 Claims, 12 Drawing Sheets

(56) References Cited

U.S. PATENT DOCUMENTS

| | | |
|---|---|---|
| 2008/0155118 A1 | 6/2008 | Glaser et al. |
| 2009/0103780 A1 | 4/2009 | Nishihara et al. |
| 2009/0279784 A1 | 11/2009 | Arcas et al. |
| 2010/0050219 A1 | 2/2010 | Angiolillo et al. |
| 2010/0332996 A1 | 12/2010 | Sarkaria |
| 2012/0249797 A1 | 10/2012 | Haddick et al. |
| 2014/0019609 A1 | 1/2014 | Williams et al. |
| 2014/0037218 A1 | 2/2014 | Zweig et al. |
| 2014/0316990 A1 | 10/2014 | Winston |
| 2015/0179147 A1 | 6/2015 | Rezaiifar et al. |
| 2017/0003750 A1 | 1/2017 | Li |
| 2018/0143757 A1 | 5/2018 | Champion et al. |
| 2018/0322674 A1 | 11/2018 | Du |
| 2018/0361258 A1 | 12/2018 | Malyuk |
| 2019/0035152 A1 | 1/2019 | Kazansky |
| 2019/0197780 A1 | 6/2019 | Rao |
| 2019/0213792 A1 | 7/2019 | Jakubzak et al. |
| 2019/0287307 A1 | 9/2019 | Rogers et al. |
| 2019/0295101 A1 | 9/2019 | Porter et al. |
| 2019/0302895 A1 | 10/2019 | Jiang et al. |
| 2019/0310757 A1 | 10/2019 | Lee et al. |
| 2019/0347762 A1* | 11/2019 | Hwang .......... G06T 19/00 |
| 2020/0089390 A1 | 3/2020 | Bakhash |
| 2020/0151965 A1 | 5/2020 | Forbes et al. |
| 2020/0193649 A1* | 6/2020 | Moon .......... G06F 3/011 |
| 2020/0279044 A1 | 9/2020 | Lum et al. |
| 2020/0320794 A1 | 10/2020 | Huang et al. |
| 2020/0401687 A1 | 12/2020 | Mak |
| 2021/0103447 A1 | 4/2021 | Wei et al. |
| 2021/0124475 A1 | 4/2021 | Inch et al. |
| 2021/0252392 A1 | 8/2021 | Stevens |
| 2021/0375065 A1 | 12/2021 | Cannefax et al. |
| 2022/0254114 A1 | 8/2022 | Frederick et al. |
| 2022/0308716 A1* | 9/2022 | Rice .......... G06F 3/0481 |
| 2022/0387873 A1 | 12/2022 | Hall et al. |
| 2022/0414487 A1 | 12/2022 | Si et al. |
| 2023/0092103 A1 | 3/2023 | Puyol et al. |

* cited by examiner

BROWSER ENABLED SWITCHING BETWEEN VIRTUAL WORLDS IN ARTIFICIAL REALITY

RELATED APPLICATIONS

This application claims priority to U.S. Provisional Patent Application No. 63/354,368, entitled "Browser Enabled Switching Between Virtual Worlds in Artificial Reality," filed on Jun. 22, 2022, and is related to U.S. patent application Ser. No. 17/867,724, titled "Virtual Hub for Control and Travel Between Virtual Worlds," filed Jul. 19, 2022, and U.S. patent application Ser. No. 17/724,597, filed Apr. 20, 2022 and entitled, "An Artificial Reality Browser Configured to Trigger an Immersive Experience," the entire contents of each of which are hereby incorporated by reference in their entireties.

TECHNICAL FIELD

The present disclosure is directed to methods and systems for navigating between multiple virtual worlds in artificial reality via a virtual web browser enabling access to those worlds.

BACKGROUND

Movement between virtual worlds in artificial reality has typically been accomplished by transitioning in and out of a home lobby. In other words, the home lobby has acted as a switching center where a current application for a corresponding virtual world is closed and another application for a subsequent virtual world is opened.

Systems for artificial reality environments can often employ avatars that can be controlled to simulate a user's movements with respect to particular places and things for those environments. For example, such movements can be directed to places and things in a virtual world currently traveled by the user. In some cases, these movements can be indicative of a user's desire to learn about and experience these places and things in ways that can most nearly approximate real-life events.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
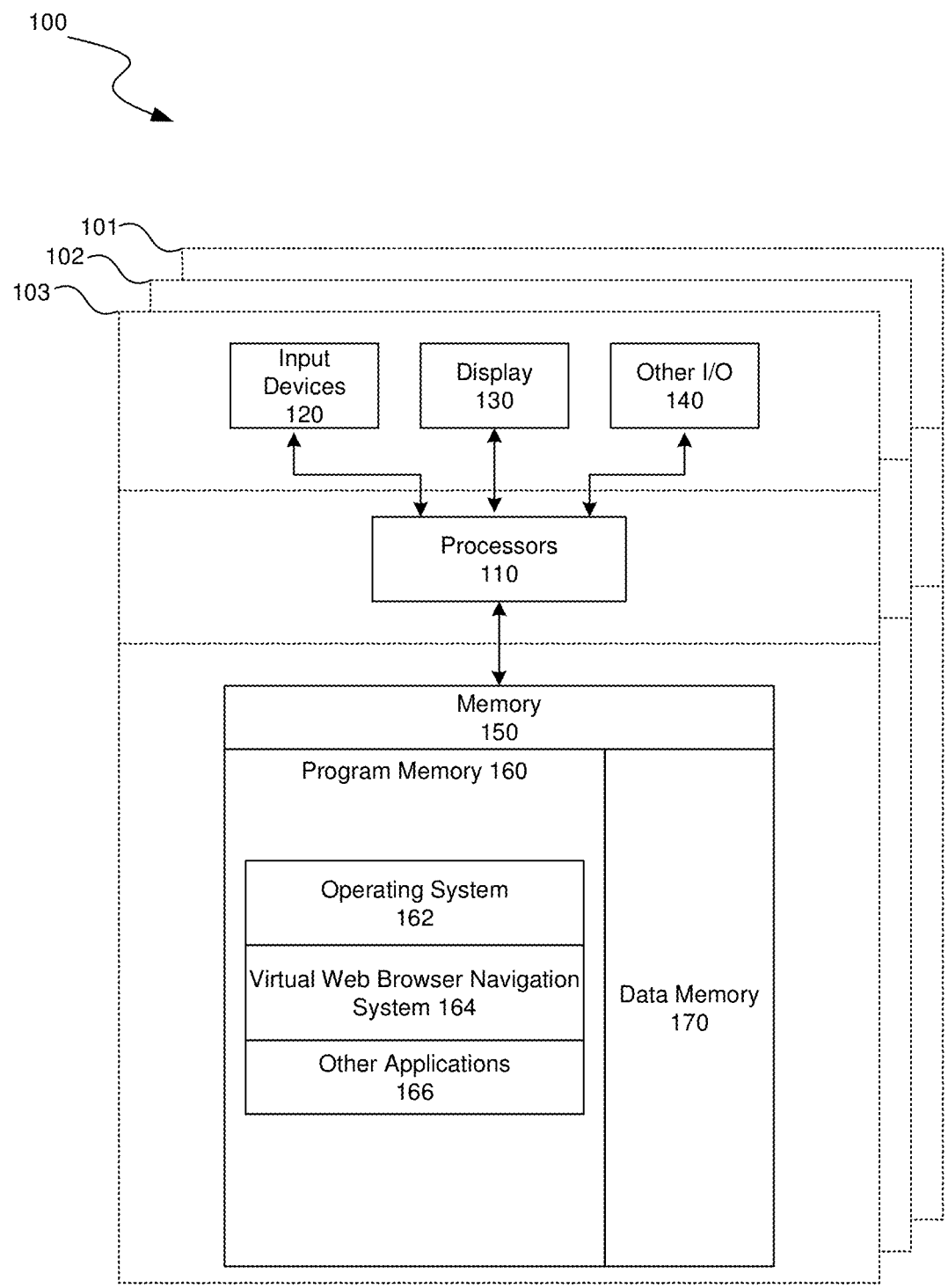
FIG. 1 is a block diagram illustrating an overview of devices on which some implementations of the present technology can operate.

Aspects of the present disclosure are directed to navigating between multiple virtual worlds in artificial reality via a virtual browser enabling access to those worlds. A virtual web browser navigation system can provide for such access via a virtual hub (herein "hub") that can present the virtual web browser to receive websites corresponding to virtual worlds. The hub can be separate from a current virtual world, allowing it to appear consistently in multiple virtual worlds and to display controls from either a website corresponding to, and in control of, a current virtual world or elements and controls for other websites corresponding to VR worlds, such as controls that enable virtual world selection and transport. In some implementations, a user can, while traveling within a current virtual world, travel to a subsequent virtual world merely by entering a website for that world and selecting a control that can provide access to that world. The virtual web browser can generate tabs for each of received websites. This way, a user can simply select a tab to cause the virtual web browser navigation system to redirect her to the corresponding website where 3D content defining an associated virtual world can be accessed.

The virtual web browser can be in communication with a remote server to obtain content for a selected website and pre-load 3D content for a virtual world corresponding to that website. In response to a user having selected a control for the virtual world where the control can be embedded in a user interface of the virtual web browser, the virtual web browser can communicate with a shell application for the virtual world to load corresponding 3D content for that virtual world.

In some implementations, the virtual web browser navigation system can, for a virtual world being traveled by a user, detect user interactions with items in that virtual world that can be associated with websites and corresponding 3D content for respective virtual worlds. As a result of one or more of such detections, the virtual web browser navigation system can cause its virtual web browser to navigate to one or more new websites and corresponding tabs. Such websites and tabs can, for respective items in a current world, be associated with 3D content for new virtual worlds corresponding to those items.

As can be understood from the above, the virtual web browser navigation system can enable a user to travel between virtual worlds corresponding to websites via accessing respective browser tabs for those websites and associated VR controls. As the user moves between virtual worlds and accumulates additional open corresponding tabs in her virtual browser, she can use these tabs to quickly and easily move back and forth between these virtual worlds. For example, a user can be in a first virtual world corresponding to a tab on her virtual browser. As she walks through portals in the virtual world, additional corresponding tabs can automatically open in her virtual browser. When the user wants to return to one of these virtual worlds, such as the first one, she can go to the corresponding tab. In some cases, going to that tab can cause the corresponding virtual world to load, while in other cases the user can go to the tab and activate a control to go to the corresponding virtual world.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing artificial reality systems require a user to transition in and out of a home lobby for applications corresponding to respective virtual worlds that a user can travel. In other words, direct travel from one world to another is unavailable for these systems. By contrast, implementations of the present technology offer a user an ability to directly switch between virtual worlds in artificial reality simply by accessing virtual web browser tabs and selecting VR controls corresponding to websites for those worlds. Implementations of the present technology can reduce the processing power and battery needed to load a lobby before entering a new virtual world, increase speed of transitions by eliminating the unnecessary step of intermediate transitions, make XR experiences more immersive by having world transitions that are linked to elements in the current virtual world, and make transitions between virtual worlds more intuitive. Further, the disclosed system can consume only as much storage as is necessary to load websites corresponding to virtual worlds that a user can travel within and between. That is, such storage can be quickly reduced due to an ability to discard a world merely by closing a tab for an associated website. In these ways, implementations of the present technology, unlike existing systems, can offer a user unfettered opportunities to spontaneously explore an infinite number of available virtual worlds without being unduly burdened by a finite number of selections (i.e., applications) for those worlds and limitations on system processing and storage.

Several implementations are discussed below in more detail in reference to the figures. FIG. 1 is a block diagram illustrating an overview of devices on which some implementations of the disclosed technology can operate. The devices can comprise hardware components of a computing system 100 that enables navigating between multiple virtual worlds in artificial reality via a virtual web browser providing access to those worlds. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory.

Memory 150 can include program memory 160 that stores programs and software, such as an operating system 162, virtual web browser navigation system 164, and other application programs 166. Memory 150 can also include data memory 170 that can include, e.g., website data and corresponding 3D content for an associated virtual world, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
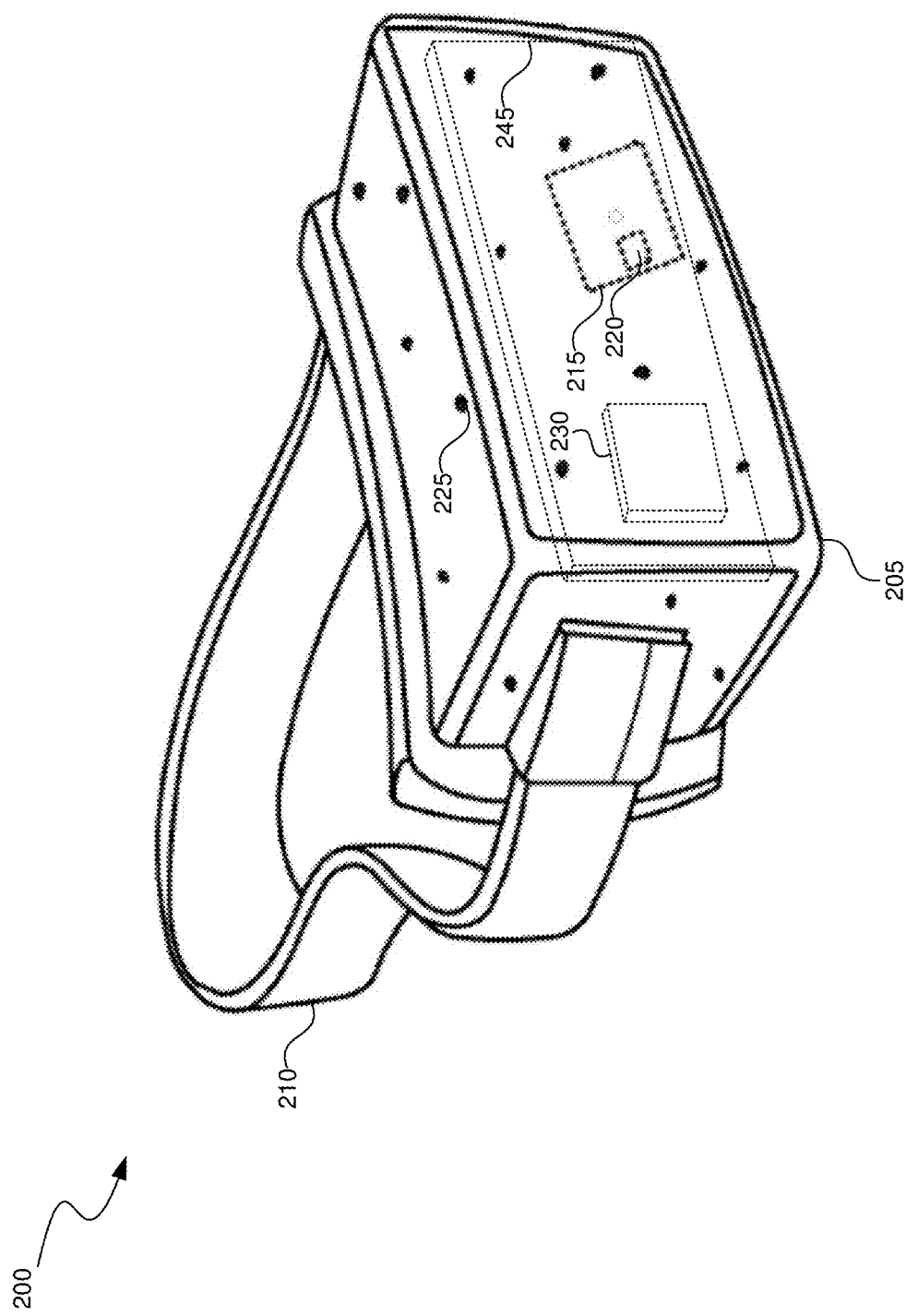
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
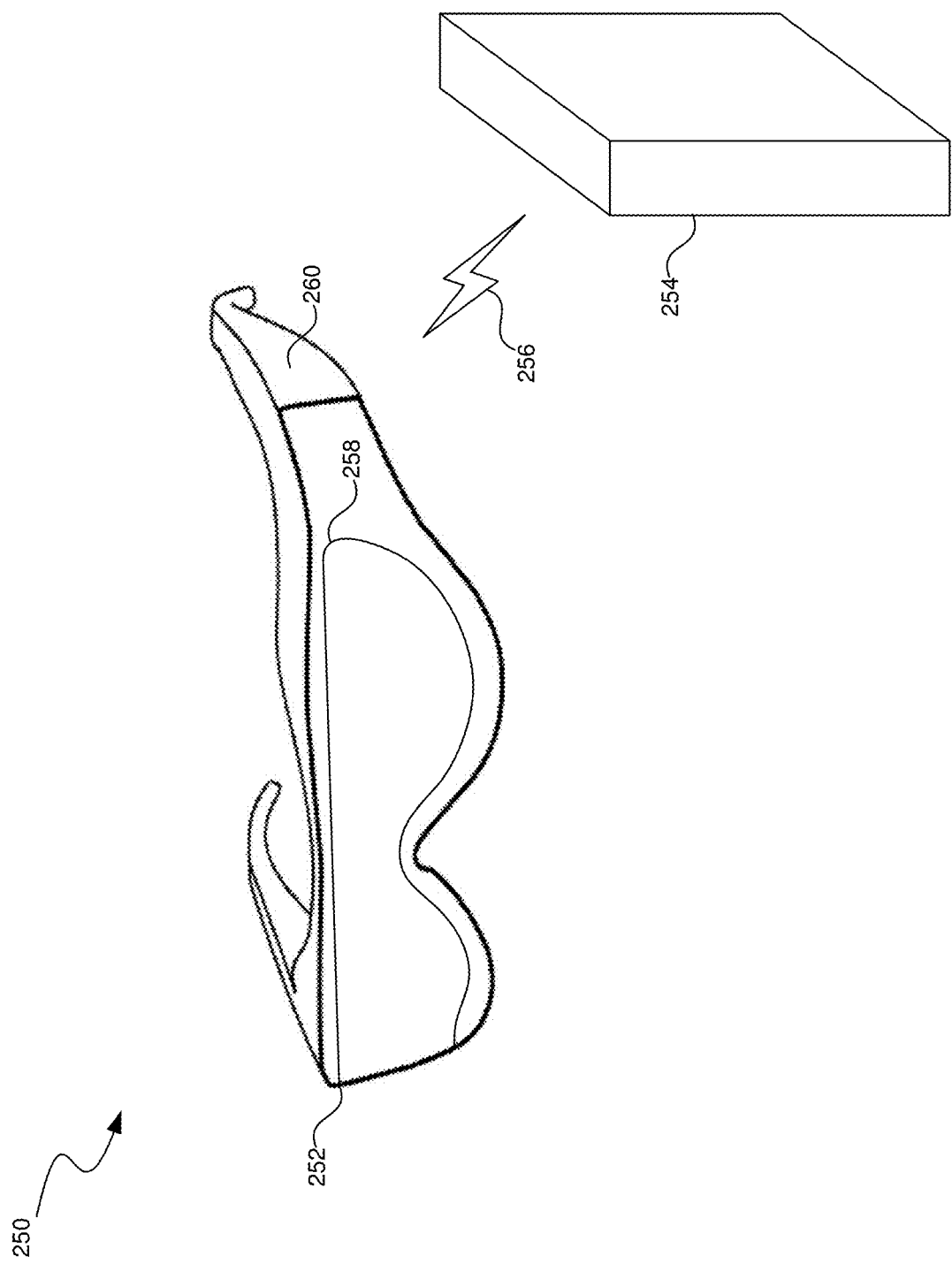
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
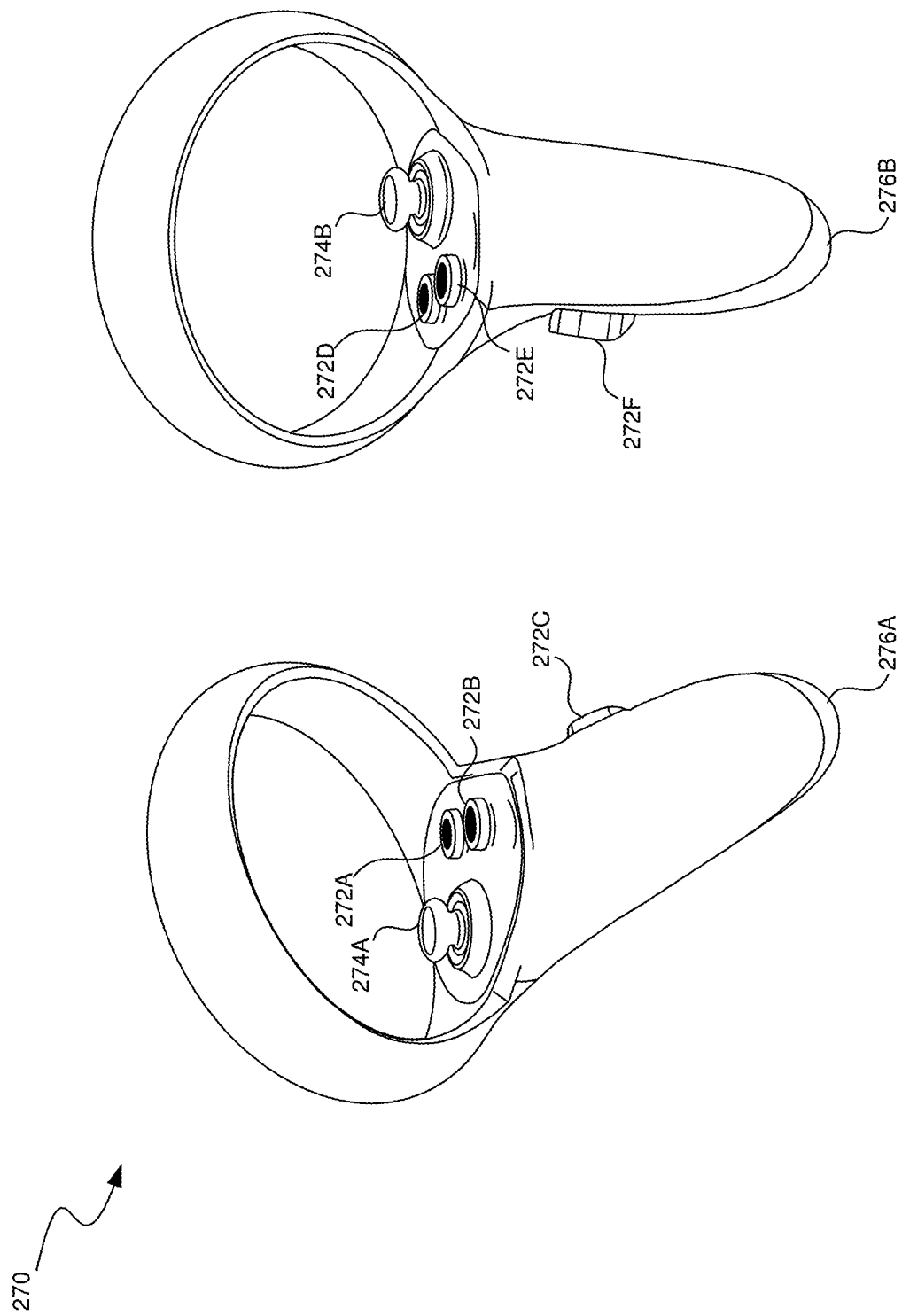
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
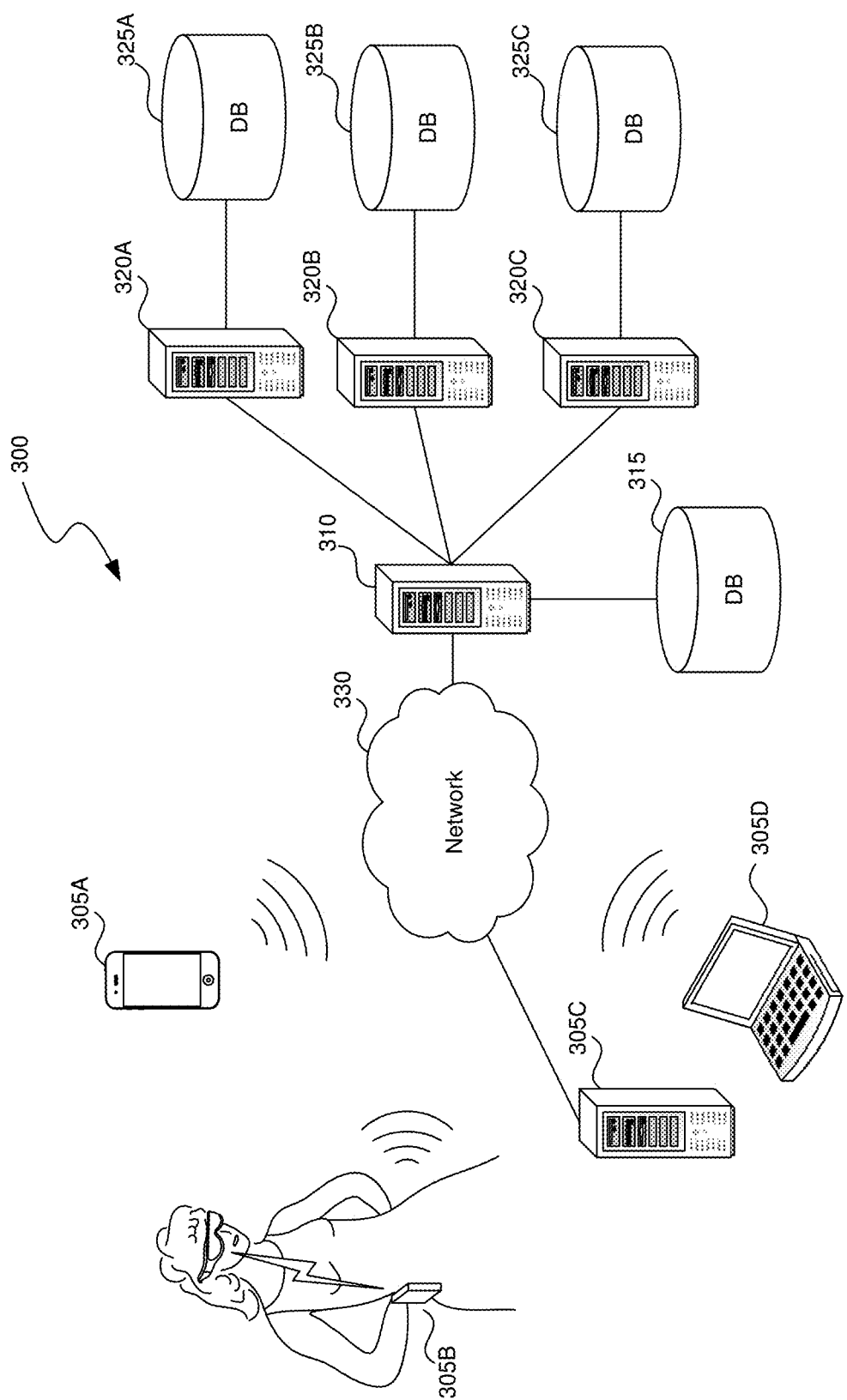
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
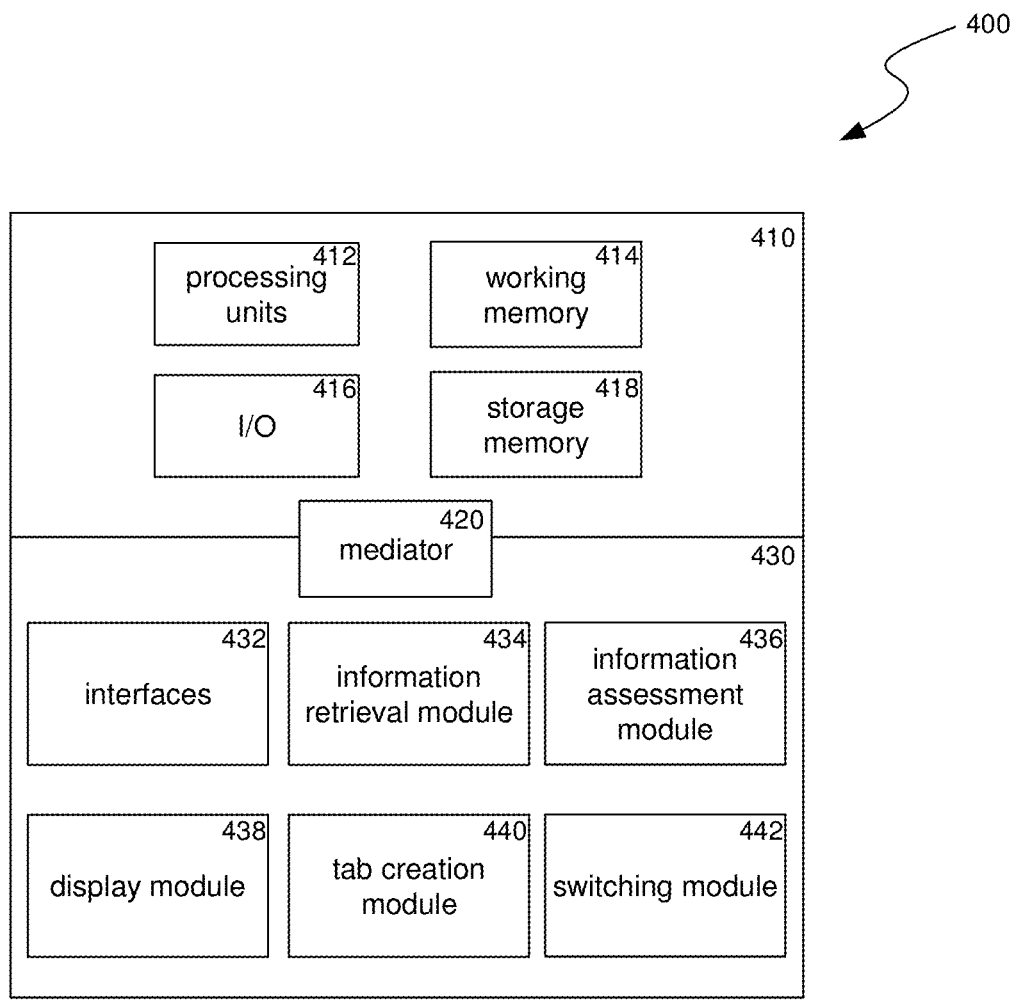
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for navigating between multiple virtual worlds in artificial reality via a virtual web browser enabling access to those worlds. Specialized components 430 can include an information retrieval module 434, an information assessment module 436, a display module 438, a tab creation module 440, a switching module 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some implementations, information retrieval module 434 can retrieve information (i.e., data) which can be used to activate the hub. For instance, such data can include gestures, utterances, and other activity of a user while traveling within a virtual world (e.g., activating a UI element on the hub). In some implementations, information retrieval module 434 can retrieve website data for websites corresponding to virtual worlds. For instance, information retrieval module 434 can, in response to a user interaction with a virtual web browser, retrieve content of a selected website and 3D content for its virtual world. In some implementations, information retrieval module 434 can retrieve data for one or more user interactions within a virtual world, and any website data corresponding to those interactions. Additional details on retrieval of the above types of data are provided below in relation to, for example, blocks 610-616, 620, 626, and 632 in FIG. 6.

In some implementations, information assessment module 436 can perform specific assessments on data retrieved by information retrieval module 434. For instance, information assessment module 436 can determine content for a website selected by a user and whether that content includes 3D content for a virtual world. In some implementations, information assessment module 436 can assess interactions between a virtual web browser and a shell application for a virtual world with respect to loading, by that shell application, respective 3D content for a virtual world. In some implementations, information assessment module 436 can assess whether user interactions within a virtual world correspond to a website that can provide 3D content for a corresponding virtual world. Additional details on the assessments performed by information assessment module 436 are provided below in relation to blocks 614, 616, 622, 624, and 626 in FIG. 6.

In some implementations, display module 438 can display content for a selected website on a hub of the virtual web browser navigation system. Display module 438 can further display 3D content for a virtual world corresponding to the website in an area remote from the hub. Additional details on the types of content that can be displayed by display module 438 are provided below in relation to blocks 618 and 624 in FIG. 6.

In some implementations, tab creation module 440 can generate tabs, in the user interface of the virtual web browser, that can enable a user to selectively access websites and corresponding virtual worlds. For example, tab creation module 440 can generate a tab for a website selected by a user. In some implementations, such a tab can include an embedded virtual reality (VR) control that can enable selective generation of a virtual world corresponding to the website represented for the tab. In some implementations, tab creation module 440 can generate a tab for a website associated with an item with which a user has interacted while traveling in a virtual world. Here, too, the generated tab can similarly include a VR control, wherein the control can enable a user to access a different virtual world than the world currently being traveled, i.e., a virtual world associated with an item with which the user has interacted. Additional details on the generation of tabs as performed by tab generation module 440 are provided below in relation to blocks 618, 620, and 630 in FIG. 6.

In some implementations, switching module 442 can facilitate transfers between virtual worlds of a user of the virtual web browser navigation system. That is, switching module 442 can, in response to a user selecting a tab associated with a website corresponding to a virtual world, reload content for that website and/or virtual world. This way, a user can seamlessly access opportunity for travel among multiple virtual worlds simply by toggling between tabs presented on the user interface for the virtual web browser. Additional details on travel between virtual worlds as enabled by switching module 442 are provided below in relation to block 632 in FIG. 6.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
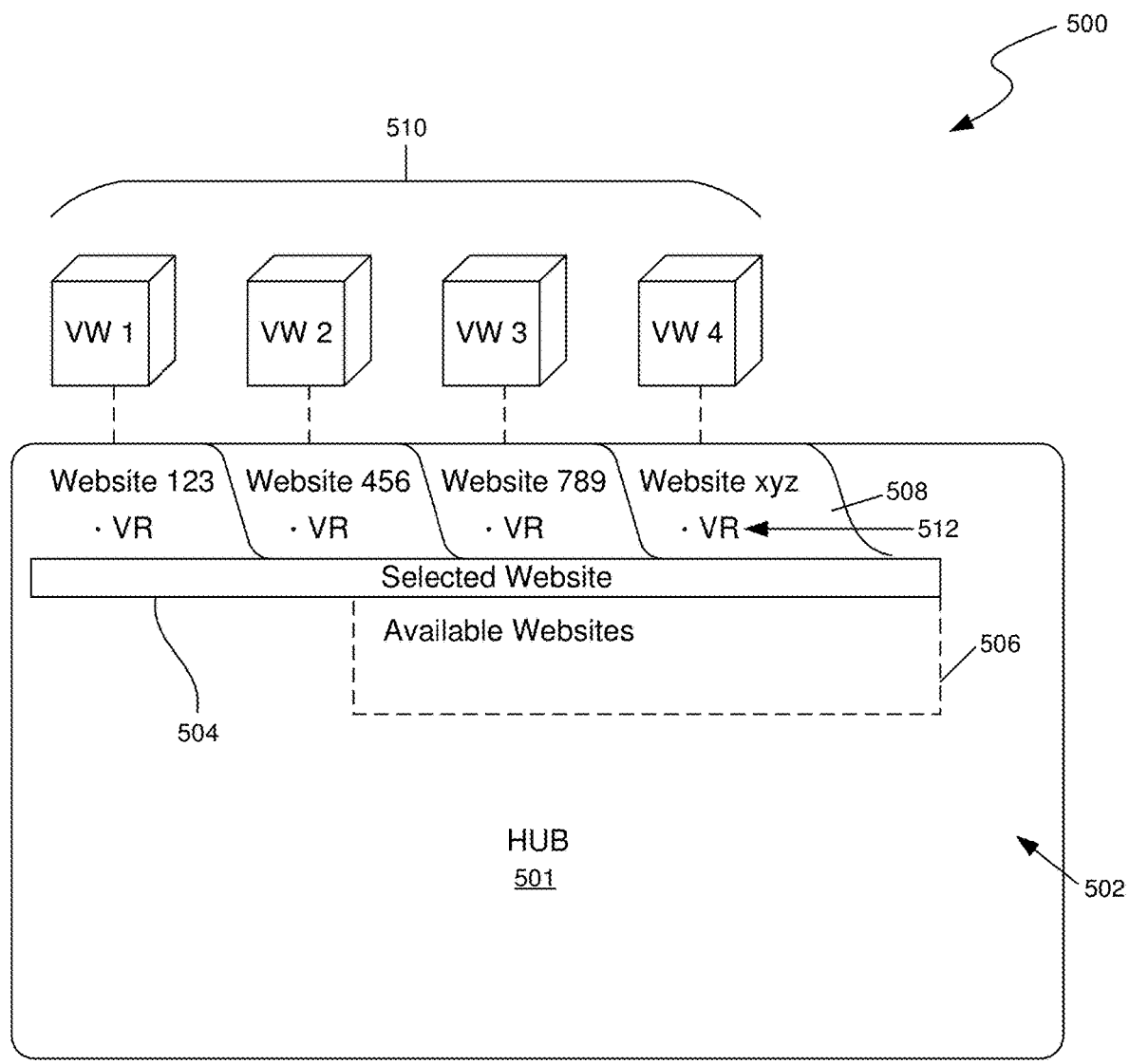
FIG. 5 is a conceptual diagram of an exemplary virtual browser setup on an artificial reality (XR) device.

FIG. 5 is a conceptual diagram of an exemplary virtual browser 500 setup on an artificial reality (XR) device, which can include the virtual web browser navigation system 164. In various implementations, the present technology can be employed to access virtual worlds in artificial reality, i.e., worlds that can be configured according to virtual reality (VR), augmented reality (AR), mixed reality (MR), hybrid reality, or some combination and/or derivatives thereof. In some implementations, the virtual web browser 500 can appear with consistent controls when displayed in different virtual worlds. In other words, the same virtual browser can be available to a user, no matter the virtual world currently being traveled. The virtual browser can be activated and displayed to the user in response to the user making one or more gestures, series of movements, utterances, activating a UI element, etc. This way, a virtual browser UI 502 of the virtual web browser navigation system 164 can be accessed by a user to newly enter or retrieve a website corresponding to a virtual world to which the user desires to travel. For instance, a user can enter a website via address bar 504, or retrieve a stored website by sorting through available websites 506. Whether newly entered or selected from among the available websites 506, virtual browser UI 502 can generate corresponding tabs 508 for entered or selected (collectively "selected") websites (e.g., Website 123, Website 456, Website 789, Website xyz) that themselves correspond to virtual worlds 510 (i.e., VW 1, VW 2, VW 3, VW 4). In some implementations, each tab 508 can have a corresponding VR control 512 that can be generated within a tab 508 or other area of the user interface of the virtual browser UI 502, and selected to cause the virtual web browser navigation system 164 to present a virtual world 508 for that corresponding tabbed website. Additional details on augmenting a virtual browser with a VR control are provided in U.S. patent application Ser. No. 17/724,597, filed Apr. 20, 2022 and entitled, "An Artificial Reality Browser Configured to Trigger an Immersive Experience," which is incorporated herein by reference in its entirety. In some implementations, such a VR control can be embedded within displayed content for a website that can be accessed by virtual web browser navigation system 164.

Figure 6:
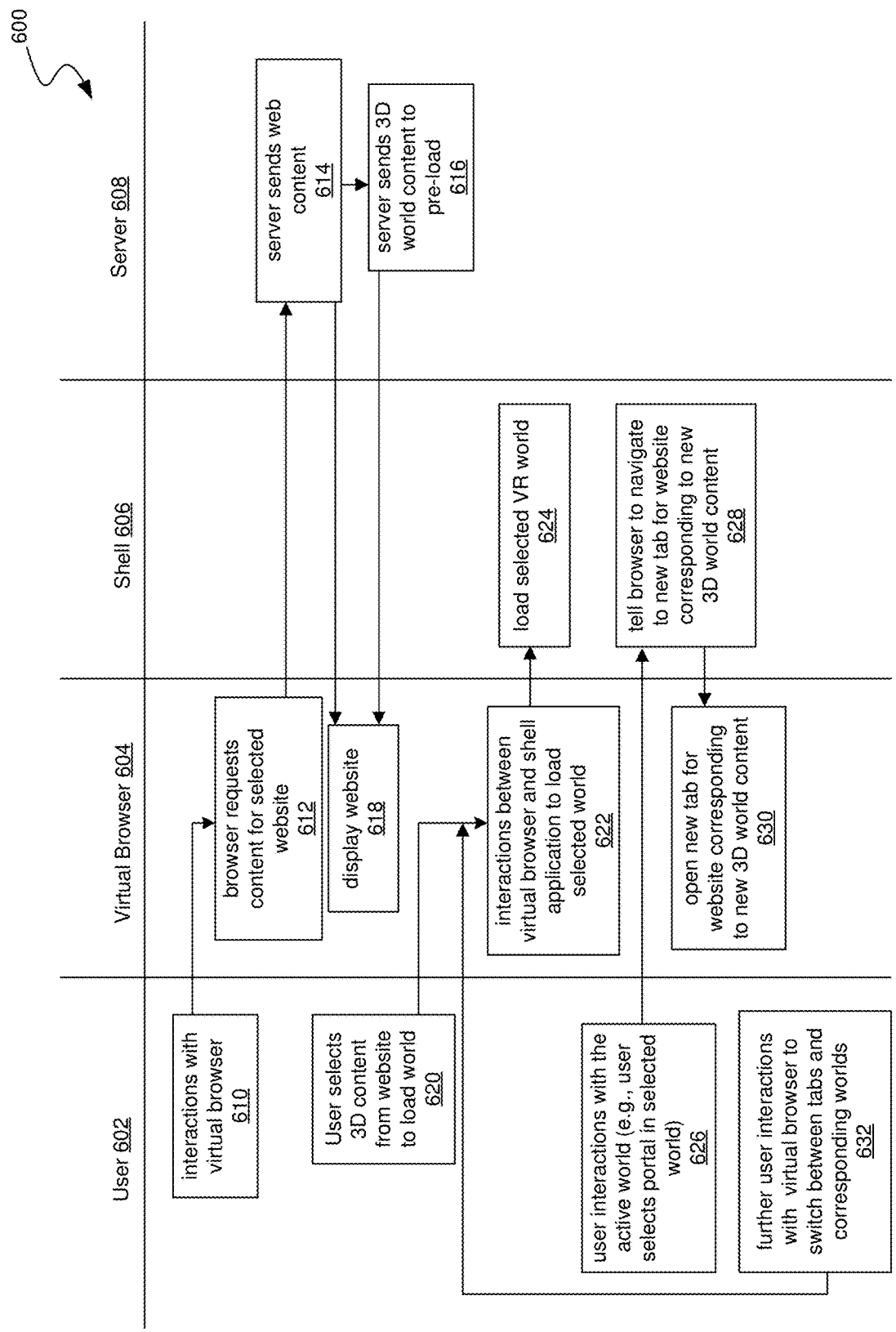
FIG. 6 is a swimlane flow diagram illustrating a process used in some implementations of the present technology for switching between virtual worlds in artificial reality via a virtual web browser.

FIG. 6 is a swimlane flow diagram illustrating a process 600 used in some implementations of the present technology for switching between virtual worlds in artificial reality via a virtual web browser. Therein, process 600 can define exchanges of commands (e.g., requests for information) and replies to the commands among a user 602, a virtual web browser 604, a shell application 606 (e.g., an application such as an XR device operating system or other application in control of loading virtual worlds and orchestrating application and user interactions within virtual worlds), and a remote server 608 that can supply content for a requested website corresponding to a virtual world. One or more portions of process 600 can be initiated whenever a user desires to travel from a current virtual world to a subsequent virtual world, or, whenever a user interacts with an item in a current virtual world. As shown, portions of process 600 can be performed on an artificial reality client device where that device can communicate with one or more servers to receive website data for virtual worlds, while other portions of process 600 can be performed on one or more server systems that can access data corresponding to virtual worlds for websites selected on the virtual web browser 604.

At block 610, process 600 can receive user interactions with virtual web browser 604. For instance, such interactions can include entry of a website corresponding to a subsequent virtual world to which a user desires to travel while still traveling within a current virtual world. In some implementations, the user can select such a website from, e.g., a drop-down list of websites (e.g., bookmarks) stored by the virtual web browser 604. In these regards, these websites can represent prior virtual worlds to which the user has traveled. In some implementations, these websites can be populated by the virtual web browser 604 as a result of detecting one or more activities for items accessible through the hub (e.g., available avatars, particular items which are personal to the user, photographs, etc.). Whether newly entered, selected from a drop-down, or otherwise navigated to through other websites, a URL for a website appearing in the address bar of the virtual web browser 604 can be executed to return the website (herein a "selected" website or a "selection" of a website).

In response to receiving a user selection according to block 610, virtual web browser 604 can, at block 612, request content for the selected website from server 606.

At blocks 614 and 616, server 606 can respectively supply the requested website content, in a first session with server 606, and corresponding 3D world content, in a second session with server 606, to virtual web browser 604. For instance, the content can include all of the structural (e.g., HTML, XML, etc.), scripting (e.g., javascript, CSS), and content (e.g., media and textual) data that can define the website. At block 616, the server can also supply 3D world content corresponding to a virtual world for the website, such as 3D models and textures, a skybox, scripting components, etc. In some implementations, the website content and the 3D world content can be respectively supplied as a result of a session between virtual web browser 604 and multiple servers (e.g., server 606 and servers in communication with server 606 and/or virtual web browser 604).

At block 618, virtual web browser 604 can display the website content (i.e., the website). Through the pre-loading of the 3D world content supplied by block 616, that 3D content can be made available to the shell 606 for future loading. In some cases, the website can be displayed at block 618 before the 3D world content is fully transferred. For example, the website can load and the user can interact with it while the 3D world content continues to be pre-loaded in the background.

Having now been presented with the displayed website, a user can, at block 620, select a control to load the 3D content for a virtual world corresponding to a selected website, i.e., to change from a current virtual world the user is viewing on the XR device to the virtual world corresponding to the website. In some implementations, a selection option, e.g., a VR control, to load the 3D content can be embedded within content of the displayed website. In some implementations, the VR control can be embedded within a user interface portion of the virtual web browser 604. For example, the VR control can be disposed alongside content displayed by the browser or embedded in a the general UI provided by the virtual web browser 604. For more information on accessing 3D world content from within a browser that can be used to navigate virtual worlds in artificial reality, see commonly U.S. patent application Ser. No. 17/724,597, filed Apr. 20, 2022 and entitled, "An Artificial Reality Browser Configured to Trigger an Immersive Experience," the entire contents of which are hereby incorporated by reference. In some implementations, upon a user selection to enter a virtual world from a website, a travel card can be provided. Additional details on travel cards are provided U.S. Provisional patent application Ser. No. 63/371,315, filed Aug. 12, 2022, and entitled, "Travel Experience when Transitioning to a Target Artificial Reality Environment," the entire contents of which are hereby incorporated by reference.

In response to a user choosing either of the above-discussed selection options to load 3D content for a virtual world corresponding to a selected website, process 600 can proceed to blocks 622 and 624. For example, virtual web browser 604 can, at block 622, interact with shell application 606 to command that application to load the selected VR world. This can include providing the 3D world content needed to load the virtual world, as preloaded from the server 608 at block 616. Shell application 606, can then, at block 624, load the selected VR world content to display the corresponding virtual world. This way, a user can interact with the virtual world corresponding to the selected website so as to move around that world, experience various items and messaging within that world, interact with other users in that world, etc.

While in a current world, process 600 can detect one or more user interactions. For instance, process 600 can, at block 626, detect user interactions in the world such as tapping on a particular item, a particular other avatar, a particular message (e.g., an advertisement), moving through a portal, etc. User interactions can be with virtual objects, each of which can be an item, a person, a message, etc. (collectively "item") in the current virtual world being traveled by a user. Some such items can correspond to a different virtual world. For instance, the item can be visually designated to the user with an indicator for that different virtual world. In some implementations, the indicator can be derived from a deeplink for the item that ties the item to virtual world other than the virtual world currently being traveled. In other implementations, the indicator can be defined by a portion of the content for a website corresponding to the virtual world currently being traveled.

When a user interacts with such items, process 600 can cause shell application 606 for the current virtual world to react at block 628. In these regards, shell application 606 can instruct virtual web browser 604 to navigate to a new tab for a website corresponding to new 3D content that can be associated with the item from the current virtual world. In some implementations, the navigation to the new tab can be the result of the item being deeplinked to the corresponding website. That is, the deeplink can be activated following detection of the user's interaction with the item. In some implementations, the trigger action can be, for example, user proximity to or selection of a particular item in a virtual world, a gaze or stare at a particular item in a virtual world, a spoken command referencing the particular item, etc.

In response to the instruction from shell application 606 to navigate to the new tab at block 628, virtual web browser 604 can then, at block 630, automatically open the new tab for the deeplinked website. In this regard, process 600 can return (not shown for simplicity), from block 630, to block 612, and accordingly perform blocks 612-618. The user can then further interact with the new virtual world or new tab (at block 632 as discussed below), iteratively viewing content, opening tabs, and jumping between worlds according to tab and world selections. For example, if a user traveling within a current virtual world interacts with an advertisement in that world, process 600 can detect that interaction. In response, shell application 606 can cause the virtual web browser 604 to navigate to a tab corresponding to, for instance, a website of an advertiser who placed the advertisement. Thus, a user can, via a tab automatically generated for the website, then gain access to a virtual world that corresponds to that advertiser. For example, the user can select a VR control associated with the tab and displayed as part of the UI of the virtual web browser 604. This way, the user can become further educated about the advertisement first seen in the current virtual world and learn about additional information and experiences associated with the advertiser. As another example, if a user traveling within a current virtual world passes through a portal that is an entryway to another virtual world, process 600 can automatically generate, on virtual browser 604, a tab corresponding to that other virtual world. As a result, access to such other virtual world can be directly made available to the user via the virtual web browser 604 in a case in which, for instance, the user passes back through the portal into the prior current world.

At block 632, process 600 can detect further interactions with virtual web browser 604 such as, for example, switching between tabs that are open in the virtual web browser 604 for corresponding websites and virtual worlds. In other words, process 600 can recognize that a selection of a tab corresponding to a website and virtual world has been terminated via a selection of another tab for a subsequent virtual world for a corresponding website. In this way, process 600 can return to blocks 622 and 624, whereby, in response to a user having selected 3D content for the subsequent virtual world (block 620), the corresponding virtual world can be loaded so that a user can then interact with that world. For example, selection by a user of a VR control for the subsequent virtual world (block 620) can cause process 600 to instantiate 3D content for the subsequent virtual world to replace a current virtual world being traveled by a user. In another example, process 600 can, while a user is traveling the subsequent virtual world and in response to the user selecting a still available (i.e., not closed) tab corresponding to the website for the replaced current virtual world and/or its VR control, reinstantiate its corresponding 3D content to once again make that world available for travel by a user. In these ways, a user can easily switch between virtual worlds through use of virtual web browser 604.

In some implementations, process 600 can, in response to a user closing a tab corresponding to a given virtual world, close that virtual world and display the most previously active virtual world for which a corresponding tab is still open in virtual web browser 604.

Figure 7:
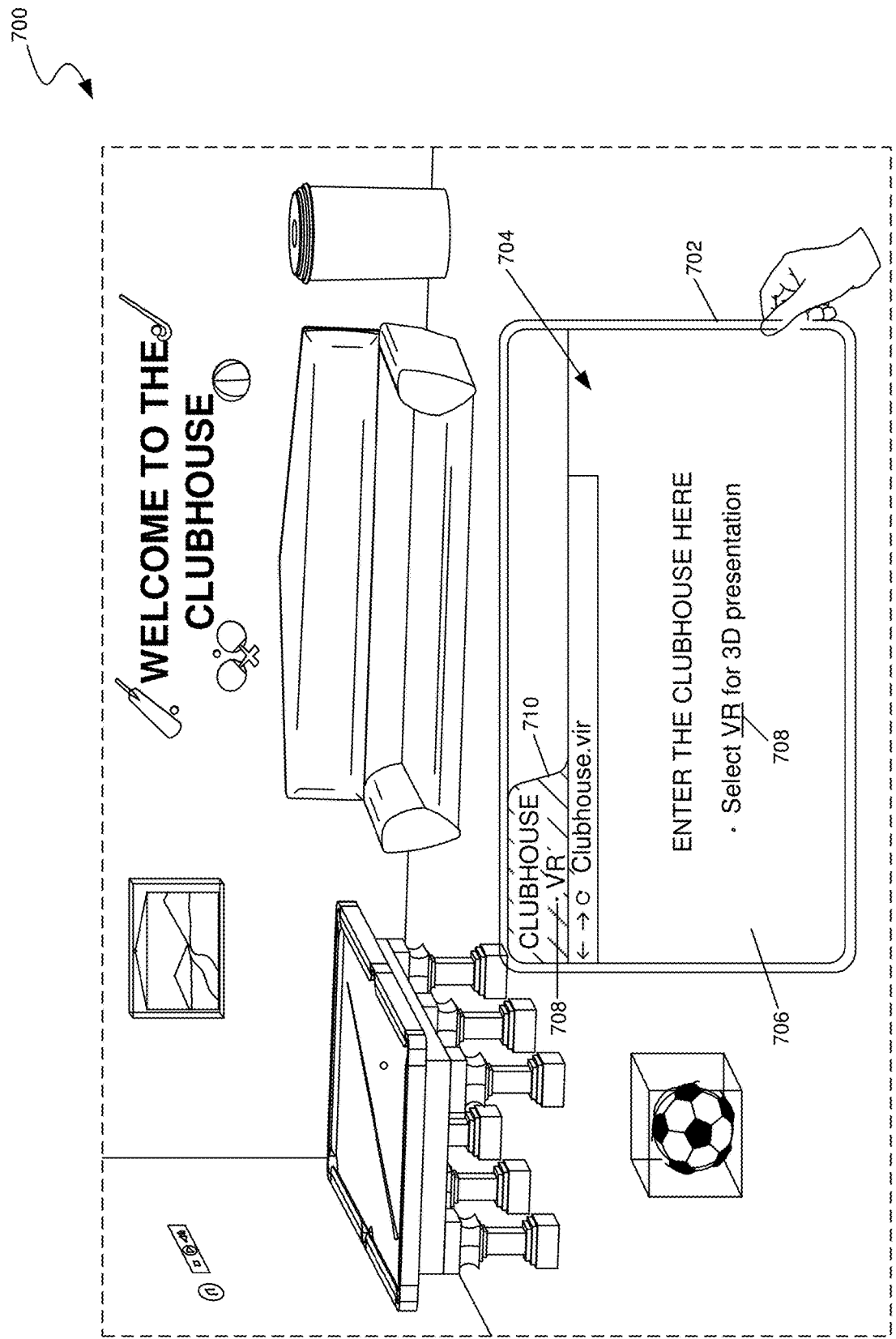
FIG. 7 is an example diagram illustrating accessing, according to implementations of the present technology, a virtual world via the virtual web browser.

FIG. 7 is an example diagram 700 illustrating accessing, according to implementations of the present technology, a virtual world via the virtual web browser navigation system 164. The virtual web browser navigation system 164 can include portions, implemented on an artificial reality (XR) device, such as a hub 702 that can be displayed to a user to enable the user to travel to a virtual world and interact with that world. For example, a user desiring to travel to a virtual world of "Clubhouse" can simply enter the corresponding website in a virtual web browser 704. Upon retrieving the website, virtual web browser navigation system 164 can generate a corresponding tab 710 and associated preliminary messaging for the Clubhouse can be presented in a display area 706 of the virtual web browser 704. For instance, a 2D version of website content can be experienced by a user as result of selecting the entry "ENTER THE CLUBHOUSE HERE." Alternatively, a user can experience a corresponding 3D world associated with website by selecting the indicated VR control 708 to generate the corresponding virtual world. While traveling within that world, a user can interact with that virtual world, such as to select items or go through portals that may open additional tabs in the web browser 704.

Figure 8:
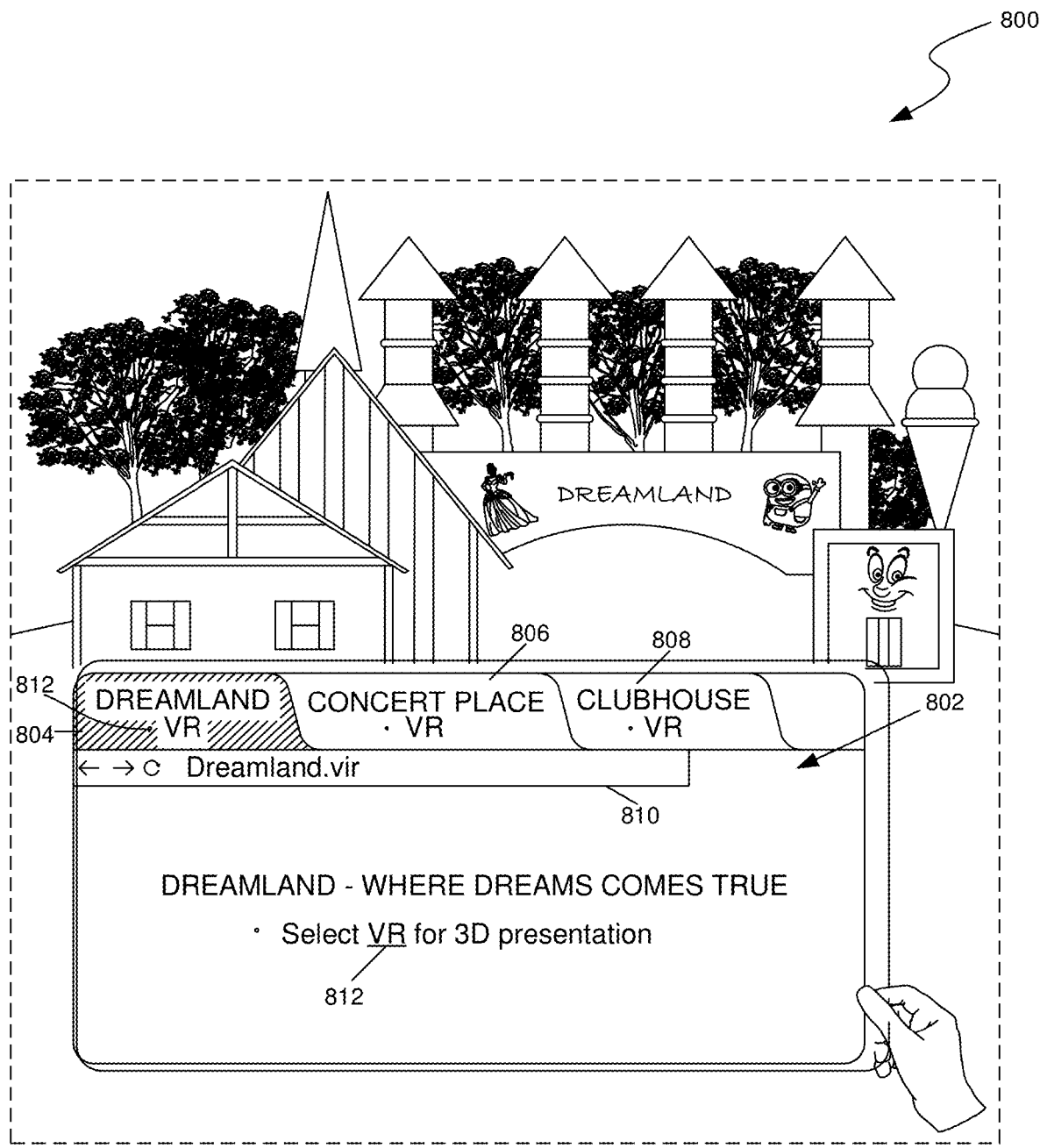
FIG. 8 is an example diagram illustrating presenting, according to implementations of the present technology, selections for virtual worlds that can be accessed via the virtual web browser.

FIG. 8 is an example diagram 800 illustrating presenting, according to implementations of the present technology, selections for virtual worlds that can be accessed via the virtual web browser navigation system 164. Similar to the virtual web browser 702 of FIG. 7, virtual web browser 802 can facilitate navigation to a virtual world corresponding to a selected website and present controls and applications that can be available for interactions with that virtual world. Here, a user has selected the virtual world corresponding to the website of "dreamland.vir" in URL bar 810, and virtual web browser navigation system 164 has generated its corresponding tab 804 in virtual web browser 802. Additionally, virtual web browser navigation system 164 has generated tabs 806 and 808 respectively reflecting previously visited websites for virtual worlds "Concert Place" and "Clubhouse." This way, as can be understood from the discussion thus far, a user can simply navigate access to each of the three available virtual worlds by toggling between the indicated tabs. In some implementations, as has been discussed, a user can access 3D content for the virtual worlds directly by selecting the indicated VR control 812 embedded within those tabs or elsewhere on the browser UI.

Figure 9:
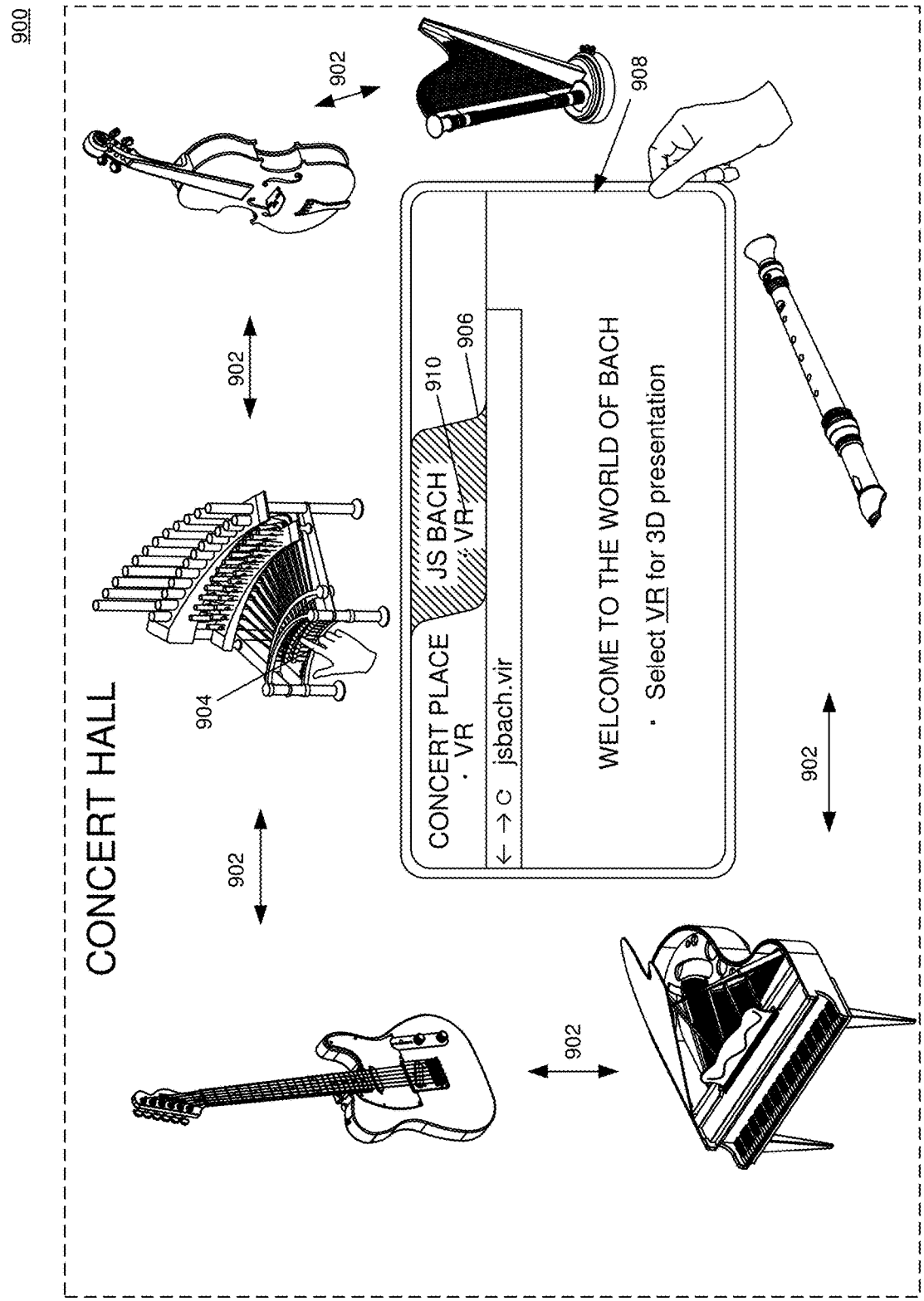
FIG. 9 is an example diagram illustrating accessing, according to implementations of the present technology, a subsequent virtual world corresponding to an item interacted with by a user in a current virtual world.

FIG. 9 is an example diagram 900 illustrating accessing, according to implementations of the present technology, a virtual world corresponding to an item engaged in another virtual world. For instance, a user can, while traveling within a current virtual world, interact with an item in that world which the user desires to learn more about. The interaction can be detected for the item via a trigger action for the item that can cause a virtual web browser, for the virtual web browser navigation system 164, to generate a tab showing a website corresponding to the item. In the case of FIG. 9, a user is shown as traveling within the current virtual world of "Concert Hall," where various musical instruments (guitar, flute, piano, harp, violin, and organ) 902 are populated for the world. In some implementations, the items can be deeplinked to corresponding websites for the items such that a detected trigger action 904 for the item (e.g., an organ) can cause the virtual web browser navigation system 164 to generate a tab 906 on virtual web browser 908 for the virtual world of "JS BACH," and correspondingly populate the tab 906 on the virtual web browser 908 with the deeplinked website. As a result, the user can then, via a VR control 910 embedded with the corresponding tab or another part of the browser UI, travel directly to the JS BACH virtual world. Otherwise, the user can continue to remain in Concert Hall to explore more of its offerings.

Figure 10:
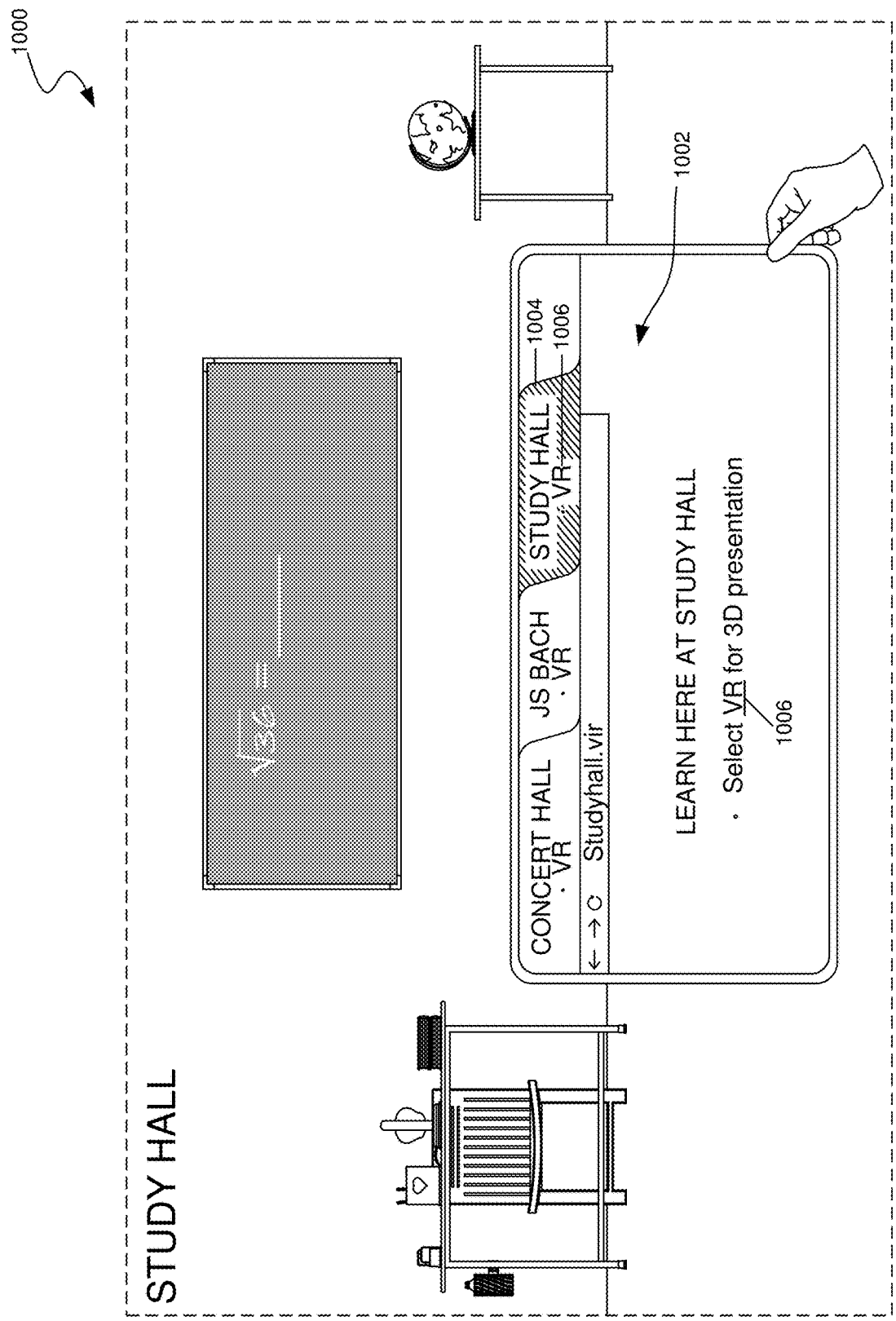
FIG. 10 is an example diagram illustrating navigating, according to implementations of the present technology, to a subsequent virtual world while traveling within a current virtual world.

FIG. 10 is an example diagram 1000 illustrating navigating, according to implementations of the present technology, to a subsequent virtual world while traveling within a current virtual world. With reference to FIG. 9, for instance, a user can, while traveling within the Concert Hall virtual world, navigate to a subsequent website for a virtual world of "STUDY HALL" via entry of its corresponding URL in the virtual web browser 1002. That is, a user can, via selection of the tab 1004 and/or the corresponding VR control 1006 for that tab, access the STUDY HALL virtual world.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of accessing virtual worlds on an artificial reality device, the method comprising:
   providing a virtual web browser;
   receiving, via the web browser, a selection of a first website related to a first virtual world of the virtual worlds;
   in response to the selection of the first website, receiving, from a server system, content for the website and 3D content for the first virtual world;
   displaying the content for the first website in a first tab of the virtual web browser;
   receiving a selection, in the virtual web browser, associated with the first virtual world;
   in response to the selection, providing a first command that causes the 3D content for the first virtual world to be instantiated to replace a second virtual world, that is currently being displayed by the artificial reality device;
   detecting a virtual world interaction related to a third virtual world;
   in response to the virtual world interaction, generating, on the web browser, a second tab for a second website associated with the third virtual world; and
   further in response to the virtual world interaction, providing a second command that causes 3D content for the third virtual world to be instantiated to replace the first virtual world.

2. The method of claim 1,
   wherein the content for the first website is received in a first session with one or more servers, and
   wherein the 3D content for the first virtual world is received in a second session with at least one server, such that the displaying the content for the first website is performed before the 3D content for the first virtual world has been received completely.

3. The method of claim 1,
wherein the virtual world interaction is a user interaction with a virtual object displayed in the first virtual world and designated with an indicator of the third virtual world.

4. The method of claim 3,
wherein the indicator of the third virtual world is based on content retrieved from accessing a link, for the third virtual world, associated with the virtual object.

5. The method of claim 3,
wherein the indicator of the third virtual world is based on a portion of the content for the first website that indicates the third virtual world.

6. The method of claim 1,
wherein the second website is associated with the third virtual world at least via a link defined in relation to a virtual object, in the first virtual world, with which the virtual world interaction was performed.

7. The method of claim 1, further comprising:
reinstantiating the 3D content for the first virtual world to replace the third virtual world by receiving a further selection, in the virtual browser, associated with first virtual world.

8. A computing system for accessing virtual worlds on an artificial reality device, the computing system comprising:
one or more processors; and
one or more memories storing instructions that, when executed by the one or more processors, cause the computing system to perform a process comprising:
providing a virtual web browser;
receiving, via the web browser, a selection of a first website related to a first virtual world of the virtual worlds;
receiving, from a server system, content for the website and 3D content for the first virtual world;
displaying the content for the first website in a first tab of the virtual web browser;
receiving a selection, in the virtual web browser, associated with the first virtual world;
in response to the selection, providing a first command that causes the 3D content for the first virtual world to be instantiated to replace a second virtual world that is currently being displayed by the artificial reality device;
detecting a virtual world interaction related to a third virtual world;
in response to the virtual world interaction, generating, on the web browser, a second tab for a second website associated with the third virtual world; and
providing a second command that causes 3D content for the third virtual world to be instantiated to replace the first virtual world.

9. The computing system of claim 8,
wherein the second command is provided in response to a further selection, in the virtual web browser, associated with the third virtual world.

10. The computing system of claim 8,
wherein the content for the first website is received in a first session with one or more servers, and
wherein the 3D content for the first virtual world is received in a second session with at least one server, such that the displaying the content for the first website is performed before the 3D content for the first virtual world has been received completely.

11. The computing system of claim 8,
wherein the virtual world interaction is a user interaction with a virtual object displayed in the first virtual world.

12. The computing system of claim 8,
wherein the virtual world interaction is a user interaction with a virtual object displayed in the first virtual world and designated with an indicator of the third virtual world, and
wherein the indicator of the third virtual world is based on (a) content retrieved from accessing a link, for the third virtual world, associated with the virtual object or (b) a portion of the content for the first website that indicates the third virtual world.

13. The computing system of claim 8,
wherein the second website is associated with the third virtual world at least via a link defined in relation to a virtual object, in the first virtual world, with which the virtual world interaction was performed.

14. The computing system of claim 8,
wherein the process further comprises reinstantiating the 3D content for the first virtual world to replace the third virtual world in response to receiving a further selection, in the virtual browser, associated with first virtual world.

15. A machine-readable storage medium having machine-executable instructions stored thereon that, when executed by one or more processors, cause the one or more processors to perform a method for accessing virtual worlds on an artificial reality device, the method comprising:
providing a virtual web browser;
receiving, via the web browser, a selection of a first website related to a first virtual world of the virtual worlds;
receiving, from a server system, content for the website and 3D content for the first virtual world;
displaying the content for the first website in a first tab of the virtual web browser;
providing a first command that causes the 3D content for the first virtual world to be instantiated to replace a second virtual world that is currently being displayed by the artificial reality device;
detecting a browser or virtual world interaction related to a third virtual world;
in response to the interaction, generating, on the web browser, a second tab associated with the third virtual world; and
providing a second command that causes 3D content for the third virtual world to be instantiated to replace the first virtual world.

16. The machine-readable storage medium of claim 15,
wherein the second command is provided in response to a further selection, in the virtual web browser, associated with the third virtual world.

17. The machine-readable storage medium of claim 15,
wherein the content for the first website is received in a first session with one or more servers, and
wherein the 3D content for the first virtual world is received in a second session with at least one server, such that the displaying the content for the first website is performed before the 3D content for the first virtual world has been received completely.

18. The machine-readable storage medium of claim 15,
wherein the detecting the browser or virtual world interaction includes the detecting the virtual world interaction; and
wherein the virtual world interaction is a user interaction with a virtual object displayed in the first virtual world and designated with an indicator of the third virtual world.

19. The machine-readable storage medium of claim 18, wherein the indicator of the third virtual world is based on
(a) content retrieved from accessing a link, for the third virtual world, associated with the virtual object or (b) a portion of the content for the first website that indicates the third virtual world.

20. The machine-readable storage medium of claim 15, wherein the process further comprises reinstantiating the 3D content for the first virtual world to replace the third virtual world in response to receiving a further selection, in the virtual browser, associated with first virtual world.

\* \* \* \* \*